Patented Dec. 7, 1948

UNITED STATES PATENT OFFICE 2,455,855

STRIPPABLE COATING COMPOSITION COMPRISING A POLYCHLOROPRENE AND A STRIPPING AGENT

Clyde G. Murphy, Metuchen, and John P. Sermattei, Matawan, N. J., assignors to E. I. du Pont de Nemours & Company, Wilmington, Del., a corporation of Delaware No Drawing. Application November 25, 1944, Serial No. 565,193

10 Claims. (Cl. 260—23)

This invention relates to coating compositions and more particularly to sprayable coating compositions which adhere to metal surfaces only slightly when applied thereto and dried, thus permitting stripping of the coating from such surfaces when desired.

The export of vast quantities of metal articles of manufacture, particularly war equipment for Allied armed forces, has created an urgent need for a means for temporarily protecting such material from the corrosive effects of the elements during transportation and storage prior to actual use of such equipment. Proper protection will also be needed for post-war export of products manufactured for peaceful purposes.

Transoceanic shipping because of exposure to salt water is particularly destructive and the tropical and arctic climates in those parts of the world where much material is sent are also highly detrimental to unprotected metal surfaces.

In many instances a permanent protective coating is not permissible, for example, on mechanical replacement parts, and for such purposes any coating which is originally applied must be capable of being readily stripped from the metal surface before the article is put to its intended use. Even when an article is finished with a permanent protective and decorative coating, it is sometimes desired to further temporarily protect this finish aganist mechanical scuffing and abrasion encountered during shipping and storage handling. Thus, a temporary readily strippable coating applied over the permanent finish insures the final consumer receiving the article in an un-marred condition. Coatings of this type applied by hot dipping methods have been partially successful but are limited in their utility to relatively small units.

This invention has as an object the provision of a coating composition which has low adherence to metal surfaces when dried whereby the film may be readily stripped from the surface even after extneded storage periods. Another object is the provision of a strippable coating composition which is waterproof, tough and resilient and which has excellent flexibility at very high and low temperatures. Another object is the provision of a strippable coating composition which affords a film that has good tensile strength and distensibility. Another object is the provision of a strippable coating composition which may be applied by spraying. Another object is the provision of a strippable coating composition which has good resistance to the passage of water vapor. Another object is the provision of a coating composition which may be stripped from permanent decorative and protective synthetic resin finishes (for example, alkyd resin finishes), cellulose derivative and varnish type finishes when thoroughly dried. Another object is the provision of a strippable coating composition which is resistant to volatile hydrocarbon oils and greases. A further object is the provision of a strippable coating composition which has good durability on outdoor exposures even in the most severe climatic conditions such as encountered in the tropics and in the far north. A further object of the invention is the provision of a strippable coating which does not develop increased adhesion to metal surfaces during extended storage periods. A still further and important object of the invention is the provision of a strippable coating composition which affords outstanding resistance to corrosion of a metal substrate when exposed to the elements including the particularly adverse conditions encountered during transoceanic shipping and extended storage at locations near salt water. Other objects will become apparent as the description of the invention proceeds.

These objects are accomplished in accordance with the present invention by means of a sprayable coating composition having low adherence to metal surfaces containing a sulfurneoprene (polymerized sulfur modified chloroprene) and a "stripping agent" consisting of a surface active compound soluble in aromatic hyldrocarbons, selected from the group consisting of soya lecithin, lead soap of petroleum oil acids and the stearyl alcohol ester of styrene-maleic anhydride reaction product. Soya lecithin gives particularly good results in promoting ease of stripping of the coating and in addition also appears to contribute somewhat to corrosion-resistance.

Therefore, the term "stripping agent," as used herein means any one of the above referred to materials; i. e., soya lecithin, a lead soap of petroleum oil acids, or a stearyl alcohol ester of a styrene-maleic anhydride reaction product.

The following example is given by way of illustration only and no limitations are intended thereby except as indicated in the appended claims.

| | Percent by weight |
|---|---|
| Neoprene KNR (polymerized sulfur modified chloroprene) | 12.58 |
| Phenyl-β-naphthylamine (anti-oxidant) | 0.26 |
| Stearic acid | 0.26 |
| Calcined magnesia (extra light) | 0.52 |
| Soft carbon black | 22.01 |
| "Circo" light process oil (low aniline point) | 1.26 |
| Zinc oxide | 0.11 |
| Soya lecithin | 0.30 |
| Plasticizer-stabilized (Du Pont #552 accelerator)[1] | 0.15 |
| Toluene | 37.70 |
| Xylene | 24.85 |
| | 100.00 |

[1] Piperidinium pentamethylene dithiocarbamate.

The neoprene used in the compositions of this invention consisted of a type having sulfur in chemical combination with the polychloroprene, made by polymerizing chloroprene (2 chloro-1,3 butadiene) in the presence of elementary sulfur as fully described in U. S. Patent 2,351,735.

This composition was prepared by milling the sulfurneoprene on a conventional differential speed rubber roller mill with the addition of the other solids ingredients until a homogeneous mass was secured after which it was cut in toluene and xylene, in the proportions shown, by mixing in with a paddle mixer. The final product had a total solids content of 37.5% and a viscosity of 16 seconds at 25° C. determined in a Parlin 10 cup. (Reference: Physical and Chemical Examination of Paints, Varnishes, Lacquers and Colors, 9th edition, 1939, page 224, H. A. Gardner.)

In order to properly cure the coating it is necessary to add an accelerator (Du Pont #833— a butyraldehyde-monobutylamine condensation product) in an amount of 0.5 part by weight and an activator (a litharge slurry consisting of 47.6% litharge and 52.4% xylene) in an amount of 4.5 parts by weight for each 100 parts by weight of the composition of Example 1 just before application to the metal surface.

Some thickening was observed when the curing accelerator and activator were added which gradually disappeared within about 2-3 hours when the composition returned to the normal spraying viscosity noted above.

Two coats of the treated composition were then sprayed on polished steel panels with ½ hour drying time between coats to give a final dry film thickness of about 8 mils. One gallon of this composition will cover approximately 431 square feet of surface area at a thickness of one mil. The equipment used in applying the coating consisted of a DeVilbiss MBC type spray gun with an FF tip and a #704 "hot spray" type head. An air pressure of 90 pounds on the line and 20 pounds on the spray pot was used. However, other types of conventional spray equipment can be used effectively also.

The coating was allowed to dry for about 20 hours to remove volatile solvents and then vulcanized by heating at 150° F. for 24 hours.

The composition was then readily stripped from the steel surface. The excellent resistance to corrosion which characterized this product is shown by the results obtained after ten consecutive cycles of exposures as follows:

16 hours at 100% relative humidity at 100° F.
3 hours at −40° F.
2 hours at 160° F.
3 hours immersion in a 5% salt solution at 70° F.

No corrosion or rusting on the polished steel surface substrate was observed.

The dry film of the coating composition of this example had a very low water vapor permeability, a film 8 mils thick having a water vapor permeability of but 50 grams per 100 square meters per hour at 39.5° C. under a vapor pressure differential corresponding to 100% relative humidity on one side of the film and less than 3 on the other side as determined in accordance with the procedure described in the "Paper Trade Journal" of October 3, 1935, pages 31–39.

The tensile strength of a film from this example with a thickness of 8 mils was about 900 pounds per square inch and the modulus at 100% elongation was about 350 pounds per square inch.

The property of ready strippability of the improved coatings was found to be retained over considerable periods with little or no tendency to develop undesirable adherence to the metal substrate surface and in this connection the "stripping agents" of the present invention contribute importantly. The tough, resilient, flexible character of the film provides protection from mechanical damage, scuffing and abrasion. The durability of the coatings including exceptional superiority in resistance to corrosion of the metal surface substrate on severe outdoor exposures was excellent and they are also marked by high resistance to volatile aliphatic hydrocarbons, oils and greases.

As previously indicated, the new compositions must be vulcanized or cured in order to obtain the optimum results in the final film properties. This is preferably accomplished by heating for example at about 150° F. for about 24 hours. Similar results may be secured by allowing the coating to cure in the air at room temperatures for a period of about 4 to 6 weeks. However, the unusually low water vapor transmission and the high degree of corrosion-resistance are apparent as soon as the volatile solvents are evaporated from the coating. It is also possible to strip the film from the metal substrate surface after about 48 hours at room temperature but for optimum results curing at elevated temperatures or for extended periods at room temperature is preferred.

The compositions are stable in storage over extended periods but following the addition of the accelerator and activator, the mixture should be used in less than 100 hours.

For satisfactory strippability the thickness of the dry film on the metal substrate surface should not be substantially less than about 4–5 mils and for adequate corrosion-resistance the film thickness should not be substantially less than about 7–9 mils. Somewhat greater thickness can be used and will give proportionately better protection, but it is not necessary and is undesirable economically.

Pigmentation of the composition affords improved outdoor durability and for this purpose those pigments commonly employed for the compound of rubber compositions are preferable. Carbon blacks such as channel black, semi-reinforcing carbon black and soft carbon black (Thermax) are satisfactory for the present purpose. Such pigments for best results are used in the proportion of about 175 parts by weight of pigment to about 100 parts by weight of sulfur-neoprene. Proportions of between about 150 parts and 250 parts by weight of pigment to 100 parts by weight of sulfur-neoprene may be used with acceptable results. Smaller amounts of pigment tend to lower water-resistance and to increase film tack, thus causing undesirable blocking in the final film when coated surfaces are placed together. Also, when less pigment is used there is a pronounced drop in the modulus of elasticity which reduces ease of stripping. Thus, when equal parts of pigment and the sulfur-neoprene are used, the modulus of elasticity is 205 pounds at 100% elongation whereas when the proportion of pigment to sulfur-neoprene is 1.5 to 1, the modulus of elasticity is 390 pounds per square inch at 100% elongation. The ultimate tensile strengths of films from such compositions are, however, substantially equivalent.

Substantially larger amounts of pigment decrease tensile strength and distensibility.

The "Circo Light Process oil" shown in the example which is a high solvency petroleum derived oil of low aniline point functions as a softener for the neoprene and contributes to the flexibility of the final film particularly at low temperatures.

Zinc oxide when used in conjunction with magnesia improves the physical properties of the vulcanized neoprene. In addition, these ingredients have been found to markedly increase the water-resistance and corrosion-resistance of the neoprene coating. This may be due to their action in neutralizing any small quantities of hydrogen chloride that may be evolved during the curing period or when the films are exposed to sunlight or serious oxidizing conditions.

The stearic acid which is preferably included in an amount of about 2% based on the sulfur-neoprene assists in processing the composition by reducing sticking to the colloid rolls, reduces the time required for the sprayed film to reach the tack-free stage (usually about 16 hours) by some exudation to the surface and also appears to contribute to making the film more readily strippable.

In order to properly cure the sprayed film it is necessary to add an accelerator, such as Du Pont Accelerator #833, a butyraldehyde-monobutyl-amine condensation product preferably to the extent of about 4% based on the sulfur-neoprene content of the composition. The action of this accelerator is augmented by the addition of about 36% based on the sulfur-neoprene content of a 47.6% litharge slurry in xylene. The addition of these materials is particularly essential if the coating is to be cured at room temperature.

A very considerable number of different types of materials were tested as to their efficacy in promoting "strippability" properties, but with the exception of those agents previously described, namely, soya lecithin, lead soap of petroleum oil acids (known as Stoprust D-1 and manufactured by the Union Oil Company of California) and stearyl alcohol ester of a styrene-maleic anhydride interpolymer which may be substituted directly for the soya lecithin in Example 1, they were found to fail in one or more of the properties necessary to provide the required results. Soya lecithin, a colloidal material consisting of about 65% phosphatides and 35% soya bean oil is particularly adapted for use in the present compositions because of the improved "strippability" and resistance to corrosion which it imparts to the coating. For most purposes, therefore, it is much preferred. The stearyl alcohol ester of a styrene-maleic anhydride interpolymer may be obtained by first preparing the styrene-maleic anhydride interpolymer in accordance with the procedures described in U. S. Patents 2,205,882 and 2,207,398. The polycarboxylic acid thus prepared may then be partly esterified by reacting with stearyl alcohol. The amount of alcohol should be less than that required for complete esterification of the polymeric carboxylic acid. The esterification may be carried out in the presence of a solvent such as an aromatic hydrocarbon.

The stripping agent of the type just described may be used in an amount of between about .05% and 5.0% by weight based on the sulfur-neoprene content of the composition in order to promote stripping of the dry film when desired. If the amount added is substantially less than .05% undesirable adherence to the metal surface substrate is observed and this tendency becomes more pronounced during extended storage periods. If the amount is increased much above 5.0%, the adhesion to the metal substrate surface is decreased beyond the desirable point so that the film is liable to come free prematurely. The optimum amount of stripping agent is about 2% based on the sulfur-neoprene content.

The property of ready strippability of the improved coatings was found to be retained over considerable periods with little or no tendency to develop undesirable adherence to the metal substrate surface and in this connection the stripping agents of the present invention contribute importantly. The tough, resilient, flexible character of the film provides protection from mechanical damage, scuffing and abrasion. The durability of the coating on severe outdoor exposures is excellent.

The KNR type of neoprene (sulfur-modified chloro-2-butadiene 1,3) shown in the example is a particularly desirable form of neoprene for the present purposes, because of its low viscosity characteristic, thus permitting higher solids in sprayable compositions, absence of webbing in spray application and rapid curing properties. The sulfur-neoprene may be accelerated strongly by the means previously described for self-curing at room temperature, a property which is important for manufacturing plants which are not equipped with curing ovens. This type of neoprene and a method for its preparation are fully described in U. S. Patent 2,351,735. In this product, the sulfur is in chemical combination with the polychloroprene and is made by polymerizing chloroprene (2-chloro-1,3 butadiene) in the presence of elementary sulfur. Other types of neoprene are not particularly adapted for use in the present invention.

The compositions of this invention are importantly useful as temporary protective coatings against weathering and corrosion in all climates, including also excellent resistance to salt water, abrasion and scuffing during shipping and storage for many articles for use such as aircraft, guns and replacement parts for all types of mechanical equipment which are shipped to all parts of the world and which must be received in perfect condition for effective use. Post-war utilities are exemplified by the use of these compositions on such units as refrigerators, washing machines, farm equipment, tractors, hydraulic presses, outboard motors and many other types of household and industrial equipment particularly when manufactured for export shipment. Many such items are finished in the factory with a conventional permanent protective and decorative coating in which the essential film-forming component is a synthetic resin (for example, a modified alkyd resin) or a drying oil (orthodox oleoresinous varnishes) and in such instances, the improved strippable coatings are likewise useful as temporary coatings, since they insure the customer's receiving the article in an un-marred condition.

The present invention affords numerous unique advantages. Of particular importance is the critical and exact balance of the degree of adhesion to metal surfaces which permits ready stripping of the film by hand but which is such that the film is not loosened or inadvertently stripped away by wind, exposure to water or ordinary mechanical abrasion and scuffing normally encountered during handling in shipping and storage.

A peculiar advantage resides in the retention of strippability over extended periods after application of the coating, without any tendency to develop increased adhesion such as is apparent in many other types of strippable coatings. The new coatings afford outstanding resistance to corrosion on the metal surface substrate under the most severe climatic conditions and on exposure to salt water. The compositions of this invention provide coatings which are tough, resilient, and flexible even at low temperature extremes. They are also resistant to volatile aliphatic hydrocarbons, oils and greases and have unusually low permeability to the passage of water vapor, a property which enhances their ability to withstand corrosion conditions. The compositions may also be applied by spraying, thus extending their utility for coating larger units where dipping or other means of application is impractical.

It is apparent that many widely different embodiments of the invention may be made without departing from the spirit and scope thereof, and therefore, it is not intended to be limited except as indicated in the appended claims.

We claim:

1. A corrosion-resistant, sprayable, strippable coating composition comprising, by weight, 100 parts of an uncured chloroprene polymer obtained by polymerizing chloroprene in the presence of an amount of elementary sulfur up to 2% by weight of the chloroprene, a curing accelerator for the said chloroprene, and about 0.05–5.0 parts of a stripping agent selected from the group consisting of soya lecithin, a lead soap of petroleum oil acids, and a stearyl alcohol ester of a styrene-maleic anhydride reaction product.

2. The composition of claim 1 in which the stripping agent is soya lecithin.

3. The composition of claim 1 in which the stripping agent is a lead soap of petroleum oil acids.

4. The composition of claim 1 in which the stripping agent is a stearyl alcohol ester of a styrene-maleic anhyride reaction product.

5. A corrosion-resistant, sprayable, strippable coating composition comprising, by weight, 100 parts of an uncured chloroprene polymer obtained by polymerizing chloroprene in the presence of an amount of elementary sulfur up to 2% by weight of the chloroprene, a curing accelerator for the chloroprene, carbon black pigment, and about 0.05–5.0 parts of a stripping agent selected from the group consisting of soya lecithin, a lead soap of petroleum oil acids, and a stearyl alcohol ester of a styrene-maleic anhydride reaction product.

6. The composition of claim 5 in which the pigment is present in an amount of between 150–250 parts by weight.

7. A corrosion-resistant, sprayable, strippable coating composition comprising, by weight, 100 parts of an uncured chloroprene polymer obtained by polymerizing chloroprene in the presence of an amount of elementary sulfur up to 2% by weight of the chloroprene, about 4 parts of butyraldehyde-monobutylamine condensation product, about 36 parts of a 47.6% litharge slurry in xylene, and about 0.05–5.0 parts of a stripping agent selected from the group consisting of soya lecithin, a lead soap of petroleum oil acids, and a stearyl alcohol ester of a styrene-maleic anhydride reaction product.

8. A corrosion-resistant, sprayable, strippable coating composition comprising, by weight, 100 parts of an uncured chloroprene polymer obtained by polymerizing chloroprene in the presence of an amount of elementary sulfur up to 2% by weight of the chloroprene, about 4 parts of butyraldehyde-monobutylamine condensation product, about 36 parts of a 47.6% litharge slurry in xylene, an antioxidant, about 150–250 parts of carbon black pigment, and about 0.05–5.0 parts of a stripping agent selected from the group consisting of soya lecithin, a lead soap of petroleum oil acids, and a stearyl alcohol ester of a styrene-maleic anhydride reaction product.

9. The composition of claim 8 in which the antioxidant is phenyl-$\beta$-naphthylamine.

10. A corrosion-resistant, sprayable, strippable coating of approximately the following composition:

| | Per cent by weight |
|---|---|
| Uncured chloroprene polymer obtained by polymerizing chloroprene in the presence of an amount of elementary sulfur up to 2% by weight of the chloroprene | 12.58 |
| Phenyl-$\beta$-naphthylamine (antioxidant) | 0.26 |
| Stearic acid | 0.26 |
| Calcined magnesia (extra light) | 0.52 |
| Soft carbon black | 22.01 |
| Light process oil (low aniline point) | 1.26 |
| Zinc oxide | 0.11 |
| Soya lecithin | 0.30 |
| Piperidinium pentamethylene dithiocarbamate | 0.15 |
| Toluene | 37.70 |
| Xylene | 24.85 |
| | 100.00 | and a curing accelerator for the said chloroprene.

CLYDE G. MURPHY.
JOHN P. SERMATTEI.

REFERENCES CITED

The following references are of record in the file of this patent:

UNITED STATES PATENTS

| Number | Name | Date |
|---|---|---|
| 2,201,064 | Thurman | May 14, 1940 |
| 2,351,735 | Bake | June 20, 1944 |